United States Patent [19]

Miller

[11] Patent Number: 4,706,991
[45] Date of Patent: Nov. 17, 1987

[54] TRAILER FRONT STONE GUARD

[76] Inventor: Mahlon A. Miller, P.O. Box 30, Nappanee, Ind. 46550

[21] Appl. No.: 801,634

[22] Filed: Nov. 25, 1985

[51] Int. Cl.⁴ .................. B60R 19/00; B60J 11/00
[52] U.S. Cl. ..................................... 280/770; 293/41; 296/70; 296/156
[58] Field of Search ............... 280/770, 153 R, 155, 280/159, 153 B, 154.5 R; 296/36, 98, 156, 78 R, 95 R, 82, 181, 74, 70; 293/41

[56] References Cited

U.S. PATENT DOCUMENTS

| | | | |
|---|---|---|---|
| 562,192 | 6/1896 | Oakes | 296/74 |
| 624,713 | 5/1899 | Warner | 280/155 |
| 2,460,394 | 2/1949 | Peatross | 280/770 |
| 2,645,521 | 7/1953 | Judson | 296/181 |
| 3,186,734 | 6/1965 | Touhey | 296/136 |
| 3,563,594 | 2/1971 | London | 296/98 |
| 4,530,519 | 7/1985 | Marshall | 280/770 |

Primary Examiner—David M. Mitchell
Attorney, Agent, or Firm—Thomas J. Dodd

[57] ABSTRACT

A retractable stone guard for the front of a towed vehicle. The guard includes a sheet of durable shape-returning material which may be stretched across the front of the vehicle during road travel. A hinged cover conceals the sheet when in its retracted position.

4 Claims, 7 Drawing Figures

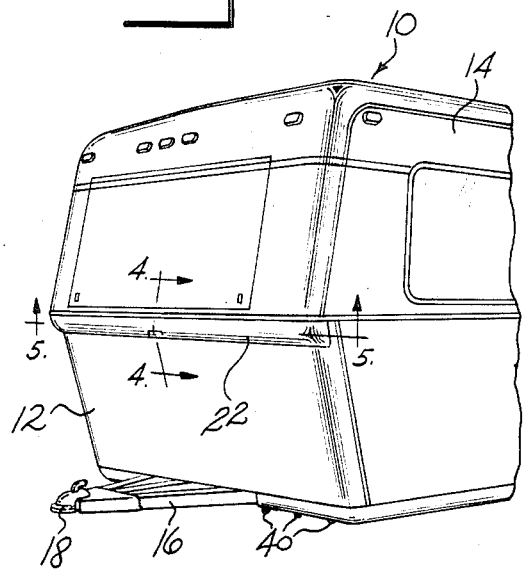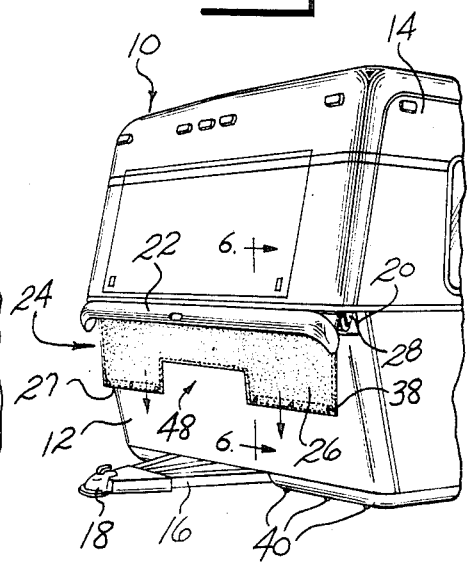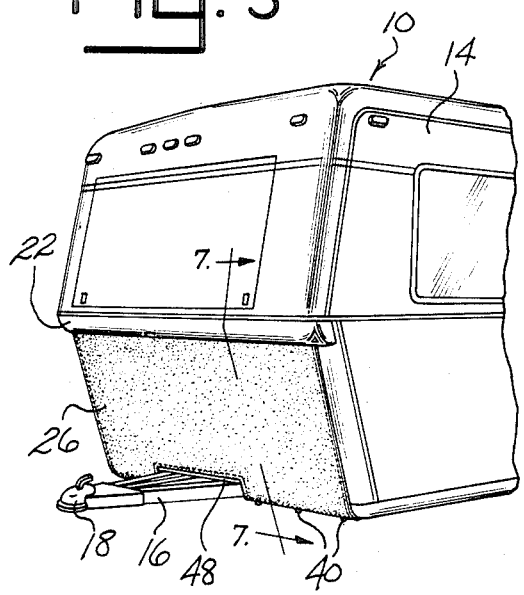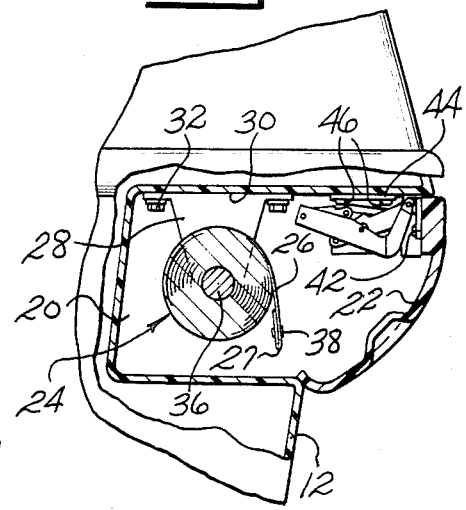

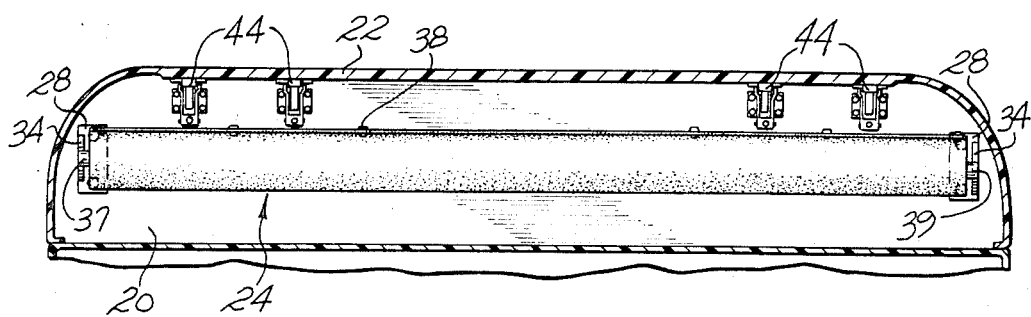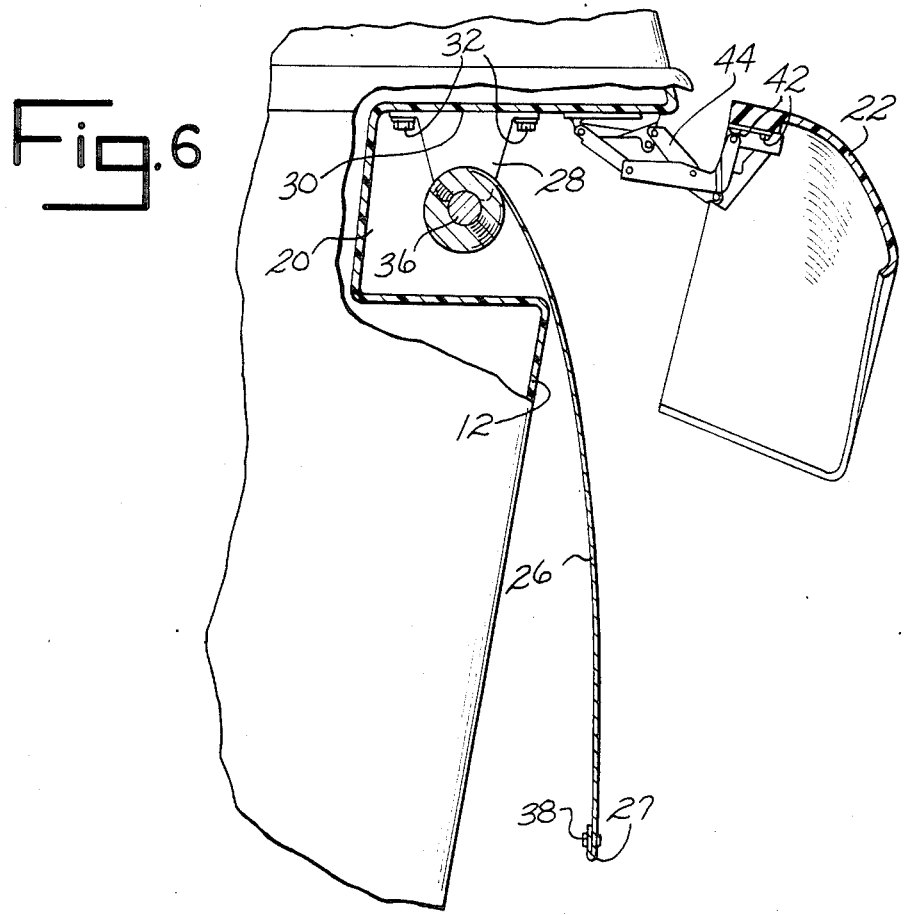

TRAILER FRONT STONE GUARD

SUMMARY OF THE INVENTION

This invention relates to a stone guard and will have special application to a retractable stone guard for a travel trailer or fifth wheel.

The lower front portion of a travel trailer or a fifth wheel is especially vulnerable to stone and debris thrown up by the rear tires of a towing vehicle during road travel. The stone guard of this invention is a retractable sheet of durable material which is stretched across the trailer front during periods of travel. When the trailer is unhitched, the guard is retracted to expose the dent-free front end.

Accordingly, it is an object of this invention to provide a stone guard which is for a travel trailer or fifth wheel.

Another object of this invention is to provide for a retractable travel trailer stone guard which can be rapidly lowered and raised.

Another object of this invention is to provide for a travel trailer stone guard which is efficient, economical and aesthetically pleasing.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a fragmentary perspective view of the front of a travel trailer with the stone guard in a fully retracted position.

FIG. 2 is a view similar to FIG. 1, but showing the stone guard in an intermediate position.

FIG. 3 is a view similar to FIG. 2, but showing the stone guard in a fully extended position.

FIG. 4 is a fragmentary sectional view taken along line 4—4 of FIG. 1.

FIG. 5 is a fragmentary sectional view taken along line 5—5 of FIG. 1.

FIG. 6 is a fragmentary sectional view taken along line 6—6 of FIG. 2.

DESCRIPTION OF THE PREFERRED EMBODIMENT

Figure 7:
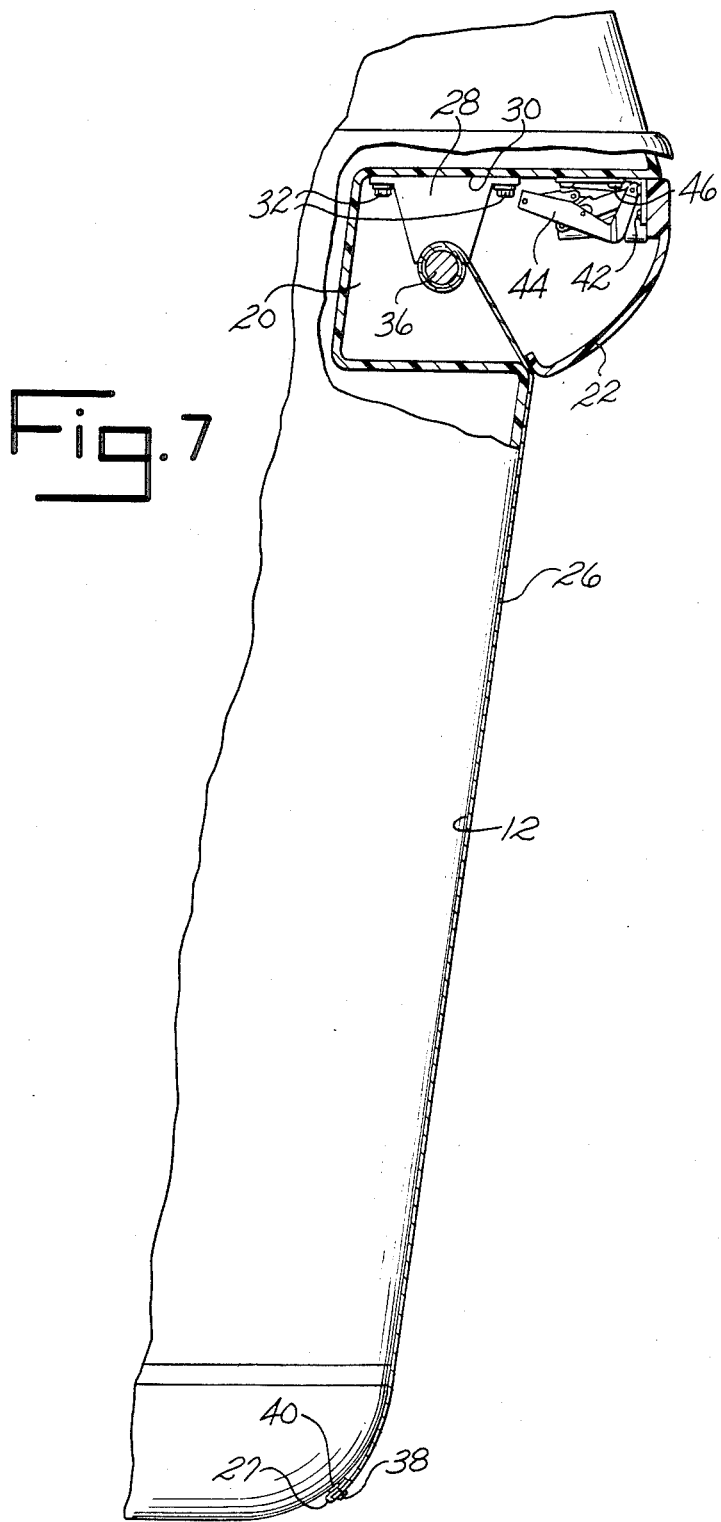
FIG. 7 is a fragmentary sectional view taken along line 7—7 of FIG. 3.

The preferred embodiment herein described is not intended to be exhaustive or to limit the invention to the precise form disclosed. It is chosen and described to explain the principles of the invention and its application and practical use to enable others skilled in the art to utilize the invention.

FIGS. 1–3 depict a travel trailer 10 which includes a front wall 12, side walls 14 (only one shown), tongue 16, and a hitch 18. Trailer front wall 12 includes a recessed channel part 20 enclosed by a cover 22. It is understood that any towable vehicle may be incorporated into the teachings of this invention with similar results.

Stone guard 24 includes a sheet 26 of flexible, yet durable material such as reinforced vinyl. A pair of brackets 28 are connected to opposite ends of channel part top wall 30 by fasteners 32. Each bracket 28 includes an integral roller guide 34. A roller 36, which is preferably a hollow spring-loaded tube similar to a conventional window shade, is fitted at its end pins 37, 39 into roller guides 34. Roller 36 includes an integral spring connected ratchet to which the fixed end pin 39 is attached. The operation of roller 36 is like that of the window shade and will not be further described. Sheet 26 is secured to roller 36 and is rolled onto the roller as shown in FIG. 4. A plurality of snap fasteners 38 are secured to the leading edge 27 of sheet 26 and mate with snap fasteners 40 at the bottom of trailer 10 (see FIGS. 1–3 and 7.)

Cover 22 is connected to hinged brackets 44 by fasteners 42. Brackets 44 are secured to channel part top wall 30 by fasteners 46 to allow cover 22 to shift between a closed position (FIG. 4) overlying channel part 20 to conceal stone guard 24 and an open position (FIG. 7).

To operate stone guard 24, cover 22 is pivoted about brackets 44 into its open position of FIGS. 2 and 6. The leading edge 27 of sheet 26 is pulled downwardly into the fully extended position of FIGS. 3 and 7. Snap fasteners 38 and 40 are connected to hold the sheet in its extended position as shown in FIG. 7. Cover 22 can then be partially closed. To release stone guard 24, cover 22 is again pivoted into its open position and snap fasteners 38 and 40 are detached. Due to the spring loaded nature of roller 36, sheet 26 is wound about the roller as the sheet is fed into its retracted position. Cover 22 is now pivoted into its closed position to conceal the rolled sheet (see FIG. 4). Sheet 26 may include a center cut-out 48 to accommodate trailer tongue 16.

It is understood that the above description is not intended to limit the invention to the details given, but may be modified within the scope of the appended claims.

I claim:

1. In combination, a stone guard and a towable trailer, said trailer including a front wall which includes a channel part, said stone guard including a sheet of durable shape returning material adjustably carried by said trailer, said sheet shiftable between an extended position covering a portion of said trailer front wall and a retracted position within said channel part wherein said trailer front wall portion is exposed.

2. The stone guard of claim 1 and a cover positioned adjacent said trailer channel part, said sheet carried by a roller located within said channel part, pivot means for shifting said cover between a closed position covering said channel part wherein said roller is concealed within said channel part, and an open position wherein said sheet may be shifted between its said extended and retracted position.

3. The stone guard of claim 2 wherein said pivot means includes a hinged bracket secured to said trailer front wall and said cover.

4. The stone guard of claim 1 and fastener means associated with said sheet and trailer for securing the sheet in its extended position.

* * * * *